United States Patent
Kohn et al.

[11] Patent Number: 5,539,133
[45] Date of Patent: Jul. 23, 1996

[54] PROCESS FOR EXTRACTING LIPIDS WITH A HIGH PRODUCTION OF LONG-CHAIN HIGHLY UNSATURATED FATTY ACIDS

[75] Inventors: Gerhard Kohn, Nieder-Olm; Günther Sawatzki, Münzenberg; Jürgen Erbe, Stuttgart; Friedrich Schweikhardt, Friedrichsdorf, all of Germany

[73] Assignee: Milupa Aktiengesellschaft, Germany

[21] Appl. No.: 185,808

[22] PCT Filed: May 27, 1993

[86] PCT No.: PCT/EP93/01334

§ 371 Date: Feb. 28, 1994

§ 102(e) Date: Feb. 28, 1994

[87] PCT Pub. No.: WO93/25644

PCT Pub. Date: Dec. 23, 1993

[30] Foreign Application Priority Data

Jun. 12, 1992 [DE] Germany ............... 42 19 360.5

[51] Int. Cl.⁶ ................................................. C07C 1/00
[52] U.S. Cl. ..................... 554/20; 554/8; 554/224
[58] Field of Search ................. 554/20, 8, 224

[56] References Cited

FOREIGN PATENT DOCUMENTS

| 0092085 | 10/1983 | European Pat. Off. . |
| 0459744 | 12/1991 | European Pat. Off. . |
| 3213744 | 11/1992 | Germany . |
| 2098065 | 11/1982 | United Kingdom . |

OTHER PUBLICATIONS

Patent Abstracts of Japan, vol. 009, No. 071, Mar. 30, 1985.
Patent Abstracts of Japan, vol. 011, No. 232, Jul. 29, 1987.
Database WPI, Section Ch, Week 9043, 1990.
Database WPI, Section Ch, Week, 7404, 1974.

*Primary Examiner*—José G. Dees
*Assistant Examiner*—Deborah D. Carr
*Attorney, Agent, or Firm*—Bacon & Thomas

[57] ABSTRACT

In the method of the invention to obtain lipids with a high proportion of long-chain polyunsaturated fatty acids (LCPs) with 20 to 22 carbon atoms by extraction from a raw material of animal or vegetable origin, unicellular algae (microalgae), macroalgae from the families of the brown, red and green algae and/or residues of alginate or carrageenin production with a water content of $\leq 50$ weight % and a particle size of $\leq 50$ mm are used. For extraction, an organic solvent or a compressed gas is used. A lipid extract with a high proportion of w6 LCP and w3 LCP and in particular with a content of at least 5 weight % of arachidonic acid and/or a content of at least 3 weight % of docosahexanoic acid is also prepared.

17 Claims, No Drawings

PROCESS FOR EXTRACTING LIPIDS WITH A HIGH PRODUCTION OF LONG-CHAIN HIGHLY UNSATURATED FATTY ACIDS

This application is a 371 of PCT/EPQ3/01334 filed May 27, 1993.

BACKGROUND OF THE INVENTION

The invention relates to a method for obtaining lipids with a high proportion of long-chain highly unsaturated fatty acids, with from 20 to 22 carbon atoms, by extraction from a raw material of animal or vegetable origin, and to the extract obtained and its use.

1. Field of the Invention

Our foodstuffs include not only saturated fatty acids but also monounsaturated and polyunsaturated fatty acids, which thus have at least one double bond in their carbon chain. These polyunsaturated fatty acids are often designated by abbreviations. The number of carbon atoms or the chain length is given first. This is followed by a hyphen or colon, which in turn is followed by a number that indicates how many double bonds there are in the carbon chain. Following that but separately, the number of omega-carbon atoms is given, counted from the methyl end of the chain, after a "w" or "n". In this system, the short formula for linoleic acid is 18-2 n6.

In fatty acid metabolism in the human being, double bonds are known to be introduced into the carbon chain of a saturated fatty acid. However, this desaturation is possible only after the carbon atom C9 in the direction toward the carboxyl end. The result is that fatty acids such as linoleic acid (18:2 n6) and α-linolenic acid (18:3 n3) must be considered essential, since they cannot be synthesized by the human organism itself but rather must be supplied from food.

From these essential C18 fatty acids, the healthy human organism is capable of synthesizing a number of polyunsaturated fatty acids having from 20 to 22 carbon atoms, by means of further desaturation and chain elongation. The elongation occurs at the carboxyl end of the molecule, and the desaturation occurs between the carboxyl group and the first double bond that follows it. The number of carbon atoms between the methyl end of the fatty acid and the last double bond (omega-C atoms) remains unchanged thereby, so that from linoleic acid (18:2 n6) in lipid metabolism, only omega-6 fatty acids (w6 family) are derived, and from α-linolenic acid only-omega-3 fatty acids (w3 family) are derived. The course of biosynthesis of the w6 family thus begins with linoleic acid (C 18-2 n6) and proceeds through gamma-linolenic acid (C 18-3 n6), di-homo-gamma-linolenic acid (C20-3 n6), and arachidonic acid (C20-4 n6) to docosapentanoic acid (C22-5 n6). With respect to the w3 family, the course of biosynthesis begins with α-linolenic acid (C18-3 n3), through octadecatetraenoic acid (C18-4 n3), eicosatetranoic acid (C20-4 n3), eicosapentanoic acid (C20-5 n3) to docosahexanoic acid (C22-6 n3).

By international convention, this group of fatty acids with extraordinary physiological importance is known as LCPs (for long-chain 12olyunsaturated fatty acids). These fatty acids with 20 to 22 C atoms are derived from the essential C18 fatty acids and have at least two double bonds in the acyl radical. The abbreviation LCP will be used below for this group of fatty acids, and a distinction is made between w6 LCPs and w3 LCPs.

The LCPs have versatile biological effects. For instance, they are an indispensable component of all the cell membranes in the body. A change in the membrane lipid composition can cause a great variety of physiological problems.

In recent years, the eicosanoids (prostaglandins, leukotrienes, prostacyclins and thromboxanes) synthesized in the organism from some LCPs have gained particular attention. It has been demonstrated that this highly active group of eicosanoids, in low concentrations, is involved in a number of physiological processes.

In infants and children, in comparison to adults, because of the relatively high need for growth and low reserves, the danger exists of a deficiency in these LCPs. In the last trimester of intrauterine fetal development and during postnatal development of the newborn, large amounts of w6 and w3 LCPs are accumulated in the organs. The capacity for synthesis of the LCPs from the essential precursors appears limited in the young infant, however, because of immaturity of the desaturating enzyme system.

2. Description of the Prior Art

Since these LCP fatty acids are virtually entirely absent from infant formulas previously available, formulas have recently been developed that are enriched with these fatty acids; see German Patent Disclosure DE 39 20 679 A1, for instance.

Because of the increased interest in LCPs, there has been an increased demand for sources of raw materials for such long-chain polyunsaturated fatty acids. The oils containing LCPs that are currently available are quite predominantly obtained from marine cold water fish (see European Patent Disclosure EP 0 292 846 A2 and German Patent Disclosure DE 39 40 239 A1). Such oils from the muscle tissue or organs of fish are distinguished by high proportions of w3 LCPs and in particular of eicosapentanoic acid (20-5 n3) and docosahexanoic acid (22-6 n3). Such oils and particularly oils from fish organs have the disadvantage, however, of a high cholesterol content and also a high content of fat-soluble vitamins and possibly fat-soluble pollutants (heavy metals and pesticides).

It has also already been proposed that LCPs be obtained from autotrophically or heterotrophically fermented microorganisms (see International Patent Disclosures WO 91/07498 and WO 91/119 182 and German Patent Disclosure DE 34 46 795 A1).

The LCPs of interest here can moreover be obtained from organ fats of livestock (cattle/pigs) and from the yolk of chicken eggs (EP 0 074 251 B2). The extraction of LCPs from human placentas is described in EP 0 140 805 A1.

SUMMARY OF THE INVENTION

The object of the present invention is to furnish a method for obtaining LCP-rich lipids from a raw material not previously used for these purposes. The object of the invention is also to furnish a lipid extract or lipid extract fractions that are rich in LCP fatty acids and that provide a foundation for producing foods, in particular baby foods, among others.

This object is obtained by the teaching of the claims.

An essential aspect of the invention is that a certain raw material is used to obtain LCP-containing lipids.

In the method of the invention, one can for instance use macroalgae, primarily occurring in the sea, from the families of brown, red and green algae. Of these, those from the Phaeoophyceae and Rhodophyceae families are of special interest. However, certain species are also used for human nutrition in other parts of the world, above all in the coastal countries of Northern Europe and East Asia (Japan). These macroalgae can be found in many continental shelf zones of the ocean and are available in practically unlimited quantities. A few macroalgae species are also intentionally cultivated in partitioned-off areas of the sea (aquaculture).

It has now surprisingly been found that lipids with a high proportion of LCPs can be extracted from these macroalgae in an economical way, if an organic solvent or a condensed gas is used. Moreover, the macroalgae are comminuted, in particular ground, before the actual extraction, so that the raw material obtained from these macroalgae and used in the method of the invention has a particle size of $\leq 50$ mm. Furthermore, the macroalgae are dried either before or after the comminution, so that their water content amounts to $\leq 50$ weight %.

Partially dried products of ground native algae available on the market ("algae flour") can also be used as raw material based on brown and red algae. These commercially available products are available and inexpensive on the market and were previously used only for soil improvement or as an additive to animal feed.

From various brown and red algae species, alginates and carrageenans are currently obtained on a large scale; they are used in the most versatile ways as hydrocolloids in the food industry. To obtain the hydrocolloids, the algae are "planted" or cultivated, harvested, dried and ground on a large scale as described above. Depending on the desired properties of the hydrocolloids to be extracted, different algae species are intentionally mixed and finally extracted in aqueous form.

It has also been surprisingly discovered that the residues that occur in the hydrocolloid extraction, which currently are not used at all or are used to only a very slight extent to produce products for soil improvement or as additives for animal feed, can be used as raw material for the method of the invention. It has in fact been demonstrated that in the extraction to obtain the hydrocolloids using acids and lyes, the LCP-containing lipids present in the algae are not damaged. On the contrary, by the removal of the hydrocolloids from the algae mixtures, there is in fact an improved yield of the extractable lipiris, including the long-chain polyunsaturated fatty acids of interest here, and at the same time there is a lower presence of hydrocolloids and pigments in the extracts.

DESCRIPTION OF THE PREFERRED EMBODIMENTS

It is preferred, according to the present invention, to use the residues that occur in hydrocolloid production as a raw material used for human nutrition. This provides optimum utilization of the residue of algae extraction. The order of the extraction processes (extraction with an aqueous and organic solvent) is in principle not significant. However, a prior alginate production is preferred, because following it the relative lipid content in the raw material and thus the yield can be increased, and the presence of hydrocolloids in the lipid extracts is minimized.

As raw material that can be used in the method of the invention, microalgae, which have in the past already been used occasionally for human food in some countries, can also be used according to the invention. These predominantly single cell algae, whose habitat is in fresh water, sea water, or brackish water, are often cultivated in open-field ponds, utilizing sunlight.

In recent years, there have been increasing attempts to ferment single cell algae under defined culture conditions. This algae biomass produced for fermentation is already available on the market, for instance for the species of the Spirulina, Dunaliella and Porphyridium genuses. In addition to these autotrophically cultivated species—that is, species cultivated under sunlight or under artificial light—methods have been developed for producing certain microalgae biomass heterotrophically in closed fermenters at economical cost. All these microalgae from the Cyanophyta, Chrysophyta, Dinophyta, Euglenophyta, Rhodophyta and Chlorophyta phyla, cultivated in open ponds or autotrophically or heterotrophically fermented, can be used according to the invention.

If the residues used according to the invention from hydrocolloid extraction and the microalgae used according to the invention have a moisture content of more than 50 weight % and/or a particle size of more than 50 mm, then this raw material is dried and/or ground prior to the extraction according to the invention, so that the water content of the biomass used in the method of the invention is $\leq 50$ weight % and the particle size is $\leq 50$ mm.

A raw material with a water content of from 5 to 50 weight %, in particular 5 to 15 weight %, and a particle size of 0.01 to 50 mm, in particular 0.1 to 1.0 mm, is preferably used.

An organic solvent or a compressed gas is used as the solvent for extraction of the lipids with a high proportion of LCPs. In particular, classic organic solvents and low alcohols with 1 to 6 carbon atoms are used as the organic solvent. Preferably, solvents and alcohols that are miscible with water in any ratio are used. Ethanol can be named as a preferred example. Naturally mixtures of the solvents named may also be used. Preferably, organic solvents that are permitted by the various legal regulations for foods are employed.

As compressed gases, carbon dioxide or propane or a mixture thereof are preferably used. The gas used must be under sufficient pressure and have sufficient temperature to assure that it will be in a liquid or supercritical state. Such compressed gases are characterized by characteristic dissolution properties, particularly for lipophilic ingredients. To change the extraction properties, other gases or liquids may be admixed with the compressed gas as an entraining agent in a quantity such that the mixture under the extraction conditions is in a uniform liquid or supercritical state. As the entraining agent, a compressed gas that is more-polar or more-nonpolar than the compressed gas used for the extraction, or an organic solvent, may be employed. In this way, the polarity of the extraction agent and thus the dissolution properties thereof can be varied or adjusted.

The extraction with an organic solvent is carried out in particular at a temperature of from 20° C. to 65° C., with the upper temperature value naturally depending on the solvent used. Extraction is preferably done at a temperature of approximately 60° C., especially if ethanol is used as the organic solvent.

The extraction is preferably carried out in the form of a batchwise extraction (maceration), percolation, decanter extraction, or countercurrent extraction. The total yields in these types of method may admittedly be less than in an extraction of all the lipids, for instance with the aid of the exhaustive Soxhlet extraction. However, these procedures can be carried out in substantially less time and are thus more economical.

In extraction with a compressed gas, percolation is preferably carried out.

Although in the context of the present application the term organic solvent is used in the method of the invention, it is nevertheless understood to mean both the corresponding water-free solvents and solvents that contain water (up to 30 volume %). Hence, standard solvents can be used without requiring them to be dried beforehand. Nevertheless, a high proportion of water can impair the yield of the desired lipids.

To separate the lipid extract from the extraction liquid (miscella) obtained from extraction with organic solvents, the temperature of the miscella is preferably lowered enough that the lipid extract precipitates out at least in part. If a solvent that is miscible with water in any ratio is used as the solvent, an example being ethanol or isopropanol, then the lipid extract can also be separated by increasing the water content, and this provision can also be combined with the described lowering of temperature. The organic solvent is then not removed, or is removed only partially, from the miscella. The miscella is mixed with water in a first stage, optionally while being cooled, so that the dissolution capacity of the mixture at the temperature selected is no longer sufficient to keep the lipids in solution. The lipids are then separated from the miscella, for instance with a filter separator.

The liquid solvent can be removed from the resultant solution at standard pressure and high temperatures, and the remaining extract can thus be recovered.

In this separation of the lipid extract from the miscella by increasing the water content and/or by lowering the temperature, the water content of the miscella is preferably increased to 20 volume % to 90 volume %, and in particular to 30 16 50%. The temperature of the miscella is preferably lowered to values of from +20° C. to −60° C, and in particular to +5 ° C. to −18° C. It is self-evident that the water content of the solvent originally used, and hence of the miscella, was above the values given prior to the addition of the water. A solvent (such as ethanol) that has a water content of 0 to 20 volume percent, in particular 4 to 15 volume percent, is preferably used.

The situation is similar for the temperature. Hence the temperature of the miscella prior to the lowering of temperature must naturally be above those values to which the temperature is lowered. Preferably the miscella is at a temperature of from 40° C. up to the boiling temperature of the solvent used.

Naturally, the total extract can also be recovered from the miscella by evaporating off the solvent. However, by increasing the water content and/or lowering the temperature it is possible for the lipids with the fatty acids of interest here to be precipitated out virtually quantitatively.

From the miscella obtained with the aid of an organic solvent or from the extract obtained from that and freed completely or partially of solvent, extraction can be done once again with a compressed gas, preferably carbon dioxide. In this preferred embodiment, the extract obtained with the aid of the organic solvent was fractionated into a nonpolar high triglyceride-containing fraction and a polar phospholipid-containing fraction, which optionally after suitable refinement can be used for manifold purposes.

The conditions for the fractionating extraction with the compressed gas are the same as for the extraction with this gas of the algae etc. originally used.

It was surprisingly found that it is possible, by selection of certain raw materials and by certain extraction steps, to obtain a lipid extract or lipid extract fractions with lipids that are rich in certain LCPs. The subject of the invention accordingly also includes a lipid extract or a lipid extract fraction with a content of arachidonic acid of at least 5 weight % and/or with a content of docosahexanoic acid of at least 3 weight %, in terms of the total weight of the fatty acids. It is self-evident that these fatty acids are not available in free form but rather in "bound form" such as triiglyceride, glycolipid, phospholipid, etc. By furnishing this lipid extract or these lipid extract fractions, it is possible among other things to furnish a raw material for producing baby foods that contains the arachidonic acid and/or docosahexanoic acid important for the development of the child. Lipids that are rich in these fatty acids are otherwise obtainable only with difficulty or in a commercially unsatisfactory way. The content of arachidonic acid and docosahexanoic acid and in particular the content of these two fatty acids in a lipid extract naturally depends on the choice of raw material used. However, it is sufficient if the lipid extract contains one of these fatty acids in a high proportion, since it can naturally be mixed with other extracts and other ingredients.

The subject of the invention is also a lipid extract or a lipid extract fraction obtainable by the method of the invention.

The LCP-containing lipid extracts or individual lipid fractions (triglycerides, glycolipids, phospholipids, etc., or mixtures of both) according to the invention may, optionally after conventional refinement and stabilization, be used as an additive to the fat content of infant formulas. The term "infant formulas" is understood here to include not only the usual starting milk formulas for premature and term infants, but also special products that are offered for therapy or prevention of atopic diseases, for instance.

Because of the characteristic proportions of LCP and their emulsifying properties, phospholipid-containing fractions from algae raw materials in particular, after suitable refinement and stabilization, can also be used as an additive in fat emulsions for parenteral nutrition.

The lipid extracts and/or lipid fractions mentioned, and/or the alkyl esters obtained after hydrolysis and reoesterification of the LCPs, may be used in suitable form (such as gelatin capsules) for the prevention of arteriosclerotic diseases and of inflammatory autoimmune diseases.

The LCP-containing fractions and in particular the phospholipid fractions can serve as an active ingredient additive to cosmetic preparations or as starting material to form liposomes, which can also be added to cosmetic preparations.

Particularly the LCP-containing phospholipid fractions, because of their physical-chemical properties, can be used as emulsifiers in the food and cosmetic industries.

Highly purified fractions of the LCP-containing lipids and the free fatty acids and fatty acid esters obtained after hydrolysis and optional re-estefification can be employed as comparison substances (standards) in analysis.

EXAMPLE 1

Extraction of Various Raw Materials Using Soxhlet Extraction

A number of different algae species and a number of different residues of alginate and carrageenan production were extracted with the aid of exhaustive Soxhlet extraction, using ethanol (96%; V/V) over a period of 40 hours. The lipids were extracted quantitatively. The natural mixtures of triglycerides, glyco- and phospholipids and fat-soluble pigments and vitamins have been referred to as complete lipids hereinafter.

The results of these extractions are summarized in Tables 1 and 2. These tables show the respective fatty acid pattern or the various total lipid or fatty acid yields.

The results listed in these Tables 1 and 2 show that the brown and red algae or the residues of alginate and carragheenin production, extracted according to the invention, have a high content of physiologically significant polyunsaturated fatty acids. Arachidonic acid (AA; 20-4 n6) and docosahexanoic acid (DHA; 22-6 n3) can be named primarily as indicative components. These fatty acids may be extracted in quite different proportions from the various raw materials. While arachidonic acid can be extracted from all raw materials in proportions of 5 to 8 weight %, the raw materials of alginate and carrageenans production designated as alginate 3 and 4 are above all characterized by characteristic docosahexanoic acid contents. In the other raw materials, this fatty acid does not occur, or occurs in only very low proportions.

The extraction yields shown in Table 2 demonstrate that the total extractable lipid content of the various algae raw materials ranges between approximately 10 and 70 g/kg of dry composition, and in each case approximately 50% total fatty acids can be recovered. In the residues of alginate production, the proportion of extractable indicative fatty acids (n6-LCP+n3-LCP) ranges up to 7 g/kg of dry substance, and in the native algae up to 6 g/kg of dry substance.

The method according to the invention can be carried out on a commercial scale especially if the two residues alginate 2 and alginate 3 of alginate production, the single-cell oil (microalgae) and the algae flour from *Ascophyllum nodosum* are used as raw materials in the method of the invention.

The extract obtained by the solvent extraction can be fractionated and purified by conventional processes. Extraction according to the invention with a compressed gas can also ensue.

TABLE 1

Fatty acid pattern of microalgae, macroalgae, and residues of alginate production by means of ethanol-Soxhlet extraction in weight % of the total fatty acid pattern

| Name | Micro | Alginate 1 | Alginate 2 | Alginate 3 | Alginate 4 | Fucus | Asco. | Lam. | Macro. |
|---|---|---|---|---|---|---|---|---|---|
| 12-0 | 0.50 | 0.78 | 0.84 | 0.20 | 1.06 | 0.08 | 0.15 | 0.51 | 0.32 |
| 14-0 | 0.49 | 9.37 | 6.94 | 10.04 | 6.16 | 11.76 | 10.40 | 7.06 | 13.90 |
| t14-1 n5 | 0.06 | 0.27 | 0.25 | 0.27 | 0.15 | 0.08 | 0.08 | 0.24 | 0.15 |
| r14-1 n5 | 0.00 | 0.11 | 0.09 | 0.23 | 1.66 | 0.09 | 0.12 | 0.05 | 0.82 |
| 15-0 | 0.42 | 0.51 | 0.30 | 0.41 | 0.55 | 0.39 | 0.33 | 0.43 | 0.74 |
| 16-0 | 49.66 | 23.53 | 17.39 | 13.40 | 27.92 | 19.27 | 12.40 | 22.39 | 29.90 |
| t16-1 n7 | 3.97 | 0.25 | 0.21 | 0.19 | 1.33 | 0.12 | 0.12 | 0.00 | 2.55 |
| 16-1 n7 | 0.45 | 3.08 | 3.00 | 1.45 | 3.46 | 1.49 | 1.28 | 4.05 | 3.16 |
| 17-0 | 0.39 | 0.16 | 0.11 | 0.18 | 0.25 | 0.15 | 0.17 | 0.14 | 0.23 |
| 18-0 | 2.97 | 0.97 | 0.63 | 0.66 | 1.80 | 0.82 | 0.93 | 1.11 | 1.51 |
| t18-1 n9 | 0.06 | 0.03 | 0.03 | 0.00 | 0.23 | 0.00 | 0.02 | 0.02 | 0.14 |
| 18-1 n9 | 1.30 | 29.34 | 22.64 | 44.34 | 22.92 | 36.33 | 43.80 | 20.01 | 22.40 |
| 18-2 n6 | 6.94 | 7.37 | 6.15 | 7.44 | 3.32 | 8.74 | 8.00 | 5.83 | 3.87 |
| 18-3 n3 | 0.78 | 3.40 | 5.69 | 1.74 | 0.78 | 2.64 | 2.30 | 6.00 | 2.00 |
| 18-4 n3 | 0.00 | 3.31 | 11.27 | 1.00 | 1.40 | 2.15 | 1.43 | 9.92 | 2.03 |
| 20-0 | 0.00 | 0.75 | 0.43 | 0.32 | 2.00 | 0.43 | 0.29 | 0.49 | 1.13 |
| 20-1 n9 | 0.00 | 0.04 | 0.05 | 0.09 | 0.80 | 0.05 | 0.11 | 0.02 | 0.04 |
| 20-2 n6 | 1.09 | 0.29 | 0.51 | 1.25 | 0.15 | 0.22 | 1.37 | 0.14 | 0.04 |
| 20-3 n6 | 0.98 | 0.45 | 0.41 | 0.58 | 0.48 | 0.76 | 0.59 | 0.30 | 0.33 |
| 20-4 n6 | 12.06 | 7.20 | 8.41 | 5.22 | 5.01 | 7.34 | 8.05 | 7.72 | 7.85 |
| 20-3 n3 | 0.00 | 0.08 | 0.16 | 0.03 | 0.02 | 0.06 | 0.27 | 0.14 | 0.03 |
| 20-5 n3 | 8.19 | 5.54 | 10.62 | 1.87 | 1.18 | 3.15 | 3.06 | 9.82 | 2.41 |
| 22-0 | 0.00 | 0.08 | 0.04 | 0.15 | 0.03 | 0.15 | 0.12 | 0.02 | 0.09 |
| 22-1 n9 | 0.00 | 0.01 | 0.01 | 0.14 | 0.68 | 0.02 | 0.30 | 0.37 | 0.04 |
| 24-0 | 0.00 | 0.09 | 0.11 | 0.21 | 0.00 | 0.14 | 0.20 | 0.05 | 0.20 |
| 24-1 n9 | 0.00 | 0.55 | 0.35 | 1.70 | 0.01 | 0.89 | 1.19 | 0.02 | 0.11 |
| 22-6 n3 | 0.00 | 0.03 | 0.00 | 3.56 | 7.40 | 0.17 | 0.08 | 0.10 | 0.05 |
| n.i. | | 9.69 | 3.38 | 3.34 | 9.24 | 2.50 | 2.74 | 3.05 | 3.85 |
| trans FS | 4.63 | 0.55 | 0.49 | 0.46 | 1.72 | 0.2 | 0.22 | 0.26 | 2.84 |
| TOTAL | 100 | 100 | 100 | 100 | 100 | 100 | 100 | 100 | 100 |

Micro = microalgae, such as *Porphyridium cruentum*; Alginates 1–4 = various residues from alginate production; Fucus = *Fucus serratus*; Asco. = *Ascophyllum nodosum*; Lam. = *Laminaria digitata*; Macro. = *Macrocystis pyrifera*; n. i. = not identified; trans FS = trans-fatty acids.

TABLE 2

Total extract, lipid extract and fatty acid yields of microalgae, macroalgae and residues of alginate production from ethanol-Soxhlet extraction in g/kg of raw material dry substance

| | Micro | Alginate 1 | Alginate 2 | Alginate 3 | Alginate 4 | Lam. | Macro. | Fucus | Asco. |
|---|---|---|---|---|---|---|---|---|---|
| GE | 233.7 | 77.22 | 98.25 | 111.32 | 52.28 | 130.64 | 61.68 | 246.92 | 157.05 |
| LE | 20.7 | 55.60 | 73.51 | 60.36 | 22.16 | 22.45 | 11.25 | 46.15 | 73.74 |
| Ges.-FS | 10.1 | 28.07 | 34.81 | 34.00 | 7.54 | 9.78 | 5.11 | 27.26 | 42.19 |
| % FS in LE | 48.8 | 50.49 | 47.36 | 56.33 | 37.48 | 43.59 | 45.40 | 59.07 | 57.20 |

TABLE 2-continued

Total extract, lipid extract and fatty acid yields of microalgae, macroalgae and residues of alginate production from ethanol-Soxhlet extraction in g/kg of raw material dry substance

|        | Micro | Alginate 1 | Alginate 2 | Alginate 3 | Alginate 4 | Lam. | Macro. | Fucus | Asco. |
|--------|-------|------------|------------|------------|------------|------|--------|-------|-------|
| n6-LCP | 14.14 | 2.28       | 3.36       | 2.48       | 0.47       | 0.82 | 0.44   | 2.33  | 4.34  |
| n3-LCP | 8.19  | 1.62       | 3.88       | 1.92       | 0.71       | 1.02 | 0.13   | 0.95  | 1.48  |
| 20-4 n6 | 2.49 | 2.07       | 3.03       | 1.84       | 0.42       | 0.78 | 0.42   | 2.05  | 3.49  |
| 20-5 n3 | 1.69 | 1.59       | 3.83       | 0.66       | 0.10       | 0.99 | 0.13   | 0.88  | 1.33  |
| 22-6 n3 | 0.00 | 0.01       | 0.00       | 1.25       | 0.61       | 0.01 | 0.00   | 0.05  | 0.03  |

Micro = microalgae, such as *Porphyridium cruentum*; Alginates 1–4 = various residues from alginate production; Lam. = *Laminaria digitata*; Macro. = *Macrocystis pyrifera*; Fucus = *Fucus serratus*; Asco. = *Ascophyllum nodosum*; GE = total extract; LE = lipid extract after removal of the hydrophilic ingredients ("FOLCH"); Ges.-FS = total fatty acids; n6-LCP = total of n6 fatty acids with 20 and more carbon atoms in the acyl radical; n3-LCP = total of n3 fatty acids with 20 and more carbon atoms in the acyl radical; 20-4 n6 = arachidonic acid; 20-5 n3 = eicosapentanoic acid; 22-6 n3 = docosahexanoic acid.

The extract is preferably freed of solvent completely by distillation at reduced pressure, and then subjected to the usual purification processes in the production of food fats in industry, such as bleaching, degumming and deodorization. The bleaching agent can already be added before complete removal of the solvent has occurred.

EXAMPLE 2

Extraction of Lipids From the Alga *Ascophyllum nodosum* With 90% Ethanol

Flour of the alga *Ascophyllum nodosum* was used as the raw material.
Characterization of the *Ascophyllum nodosum* raw material:
Water content: 9.6%

| Particle size Screen mesh width (mm) | % distribution |
|---|---|
| 0.5 | 0.2 |
| 0.25 | 0.4 |
| 0.1 | 75.4 |
| 0.05 | 23.1 |
| >0.05 | 0.9 |

The solvent extraction over four hours was performed with ethanol (90%; V/V) at various temperatures. In the apparatus used, the process was a single-stage percolation done on a laboratory scale. The ratio between the extraction agent used and the raw material dry substance was approximately 4:1 (weight/weight).

In comparison with the Soxhlet extraction (see Table 3), in which an extraction time of 40 hours was adhered to, the yield of the four-hour percolation was uniformly quite high. It demonstrated that increasing the extraction temperature leads to an improved yield in all the extract ingredients. Further optimization of the yield in the extraction of this raw material is attainable by further increasing the ratio between the solvent and the raw material or by changing the course of the process in the direction of countercurrent extraction (see Example 3).

TABLE 3

Extraction yields in percolation, in percent of raw material dry substance

| Temp. (°C.) |   | 20 | 30 | 40 | 50 | 60 | Soxhlet |
|---|---|---|---|---|---|---|---|
| GE | % | 8.06 | 11.01 | 14.34 | 16.54 | 17.89 | 15.7 |
| FS | % | 0.93 | 1.18 | 1.25 | 1.34 | 1.41 | 4.22 |
| 20-4 n6 | % | 0.09 | 0.11 | 0.12 | 0.13 | 0.14 | 0.35 |
| 20-6 n3 | % | 0.05 | 0.06 | 0.06 | 0.07 | 0.08 | 0.13 |
| Concentration | % | 2.5 | 2.3 | 3.1 | 3.4 | 3.7 |  |

GE = total extract; FS = fatty acid yield; 20-4 n6 = yield of arachidonic acid; 20-5 n3 = yield of eicosapentanoic acid The results of the one-stage percolation test shown in FIG. 3 show that with this experimental apparatus, yields of 41% of the arachidonic acid fractions and 58.5% of the eicosapentanoic acid fractions are attained, compared with the Soxhlet extraction. By the percolation process, it was possible to recover a total of 33.4% of the maximum extractable fatty acids. The value for the total extract yield, which is elevated compared with Soxhlet extraction, can be ascribed to the higher water content (10%) of the ethanol used in the percolation and the resultant more-intensive extraction of hydrophilic substances.

From Table 3, it is also clear that for the extraction of the flour of the alga *Ascophyllum nodosum* with 90% ethanol, an extraction temperature of approximately 60° C. is to be sought, if the method is to be optimized in terms of the miscella concentration, that is, the solvent consumption. Naturally comparable yields are also attainable at lower temperatures and with a correspondingly higher amount of solvent.

EXAMPLE 3

Staged Countercurrent Extraction of a Residue From Alginate Production With 90% Ethanol In this example, a raw material was used that was already used to recover alginate (alginate 1). This residue is a mixture of various species of brown algae. The algae residues were dried and ground after the alginate production process, so that in terms of particle size and water content they are approximately equivalent to the flour of the alga *Ascophyllum nodosum* (see Example 2).

The extraction method of staged countercurrent extraction employed is equivalent to the process carded out on an industrial scale. In contrast to percolation (Example 1), the extract concentration of the miscella in multistage countercurrent extraction fluctuates around a mean value. The more stages that are used and the shorter the dwell time of the raw material in the apparatus, the less pronounced this fluctuation is. With this method, by comparison with percolation, identical yields can be attained, using only a fraction of the solvent, or higher yields can be attained using similar quantities of solvent.

In the example chosen, a four-stage experimental apparatus was chosen. The extraction temperature was 20° C.; the ratio between the quantity of extraction agent used and the raw material dry substance was 2:1.

Despite the comparatively simple apparatus (30 stages and more are not unusual in industrial systems), it was possible in this example to attain yields of 66% of arachidonic acid, 72.5% of eicosapentanoic acid and 45.7% of the total fatty acids, by comparison with the Soxhlet extraction.

TABLE 4

Yields of the multistage countercurrent extraction of alginate 1 compared with Soxhlet extraction, in weight % in terms of the raw material dry substance

| Yield | Countercurrent extraction | Soxhlet extraction |
| --- | --- | --- |
| Total extract | 5.92 | 7.72 |
| Total lipid extract | 4.24 | 5.56 |
| Total fatty acids | 1.28 | 2.80 |
| Arachidonic acid (20-4 n6) | 0.13 | 0.20 |
| Eicosapentanoic acid (20-5 n3) | 0.12 | 0.16 |

If these values are compared with the results of the percolation in Example 2, the advantages of countercurrent extraction become clear. Although in countercurrent extraction only 50% of the quantity of solvent was used and the extraction temperature was only 20° C., the yields in terms of total fatty acid and arachidonic acid are nevertheless clearly superior to that of percolation.

EXAMPLE 4

Extraction of Flour of the Alga *Ascophyllum nodosum* with Compressed Carbon Dioxide For extraction with compressed gases, the dried, ground raw material of native algae or of residues from alginate and carrageenan production is used. The water content of the starting material is typically between 5 and 50 weight % and preferably between 10 and 20 weight %. The particle size of the material is 0.01 mm to 50 mm, preferably 0.1 mm to 0.3 mm.

The raw material used is the algae flour of *Ascophyllum nodosum* already employed in Example 2. The extraction was carried out with compressed carbon dioxide (150 bar, 35° C., approximately 11 kg of $CO_2$/kg of raw material). Under these conditions, at least 90% of the total lipids extractable with this solvent can be recovered.

TABLE 5

Extract and fatty acid yields of high-pressure extraction of *Ascophyllum nodosum* in comparison with ethanol Soxhlet extraction, in weight % of the raw material dry substance

| Yield | High pressure extraction | Soxhlet extraction |
| --- | --- | --- |
| Total lipid extract | 2.50 | 7.30 |
| Total fatty acids | 2.10 | 4.20 |
| Arachidonic acid (20-4 n6) | 0.18 | 0.35 |
| Eicosapentaenoic acid (20-5 n3) | 0.08 | 0.13 |

In Table 5, the maximum attainable yields in terms of the raw material mentioned with each method are compared. Soxhlet extraction here stands for processes of solvent extraction using ethanol overall because in principle this represents nothing more than a repeated process of percolation/maceration.

To enable evaluating the quality of the extracts obtained, the fatty acid pattern of the extracts recovered by the two methods are compared in Table 6.

TABLE 6

Comparison of the fatty acid spectra of a high-pressure extract and a Soxhlet extract of *Ascophyllum nodosum*; figures given as weight % of the total fatty acids

| Fatty Acids | High-pressure Extract | Soxhlet Extract |
| --- | --- | --- |
| 14-0 | 5.58 | 10.4 |
| 14-1 n5 | 0.15 | 0.12 |
| 16-0 | 7.46 | 12.4 |
| 16-1 n7 | 0.94 | 1.28 |
| 18-0 | 0.97 | 0.93 |
| 18-1 n9 | 53.8 | 43.8 |
| 18-2 n6 | 9.56 | 8.0 |
| 20-0 | 0.34 | 0.29 |
| 18-3 n3 | 1.58 | 2.3 |
| 20-1 n9 | 0.48 | 0.11 |
| 20-2 n6 | 1.77 | 1.37 |
| 22-0 | 2.88 | 0.12 |
| 20-3 n6 | 0.91 | 0.59 |
| 22-1 n9 | 0.44 | 0.30 |
| 20-4 n6 | 7.26 | 8.05 |
| 20-5 n3 | 2.18 | 3.06 |

The results in Table 6 clearly show that the solvent extract of *Ascophyllum nodosum* has only a slightly more favorable composition in terms of the proportion of arachidonic acid and eicosapentanoic acid, compared with the high-pressure extract. Since with the aid of high-pressure extraction, it is primarily nonpolar lipids (triglycerides) that are extracted, it must be presumed that the indicative fatty acids also occur in high proportions in these lipids.

EXAMPLE 5

Separation of the Lipid Fraction From the Miscella by Increasing the Water Content Separation of the lipid fraction from the miscella by increasing the water content was carried out in the example of the miscella obtained by Staged countercurrent extraction of alginate 2 with 90% ethanol. Five aliquot portions were taken from the miscella and adjusted to various water contents, beginning with 10% water in the starting miscella (see Table 7). The extracts precipitated after the addition of water were recovered by centrifuging, decanting of the remainder, and ensuing drying.

Table 7 below clearly shows the relationship that exists between the water content of the miscella and the yields of the precipitated lipid fractions. The table shows the lipid yields obtained with a comparison extract that was recovered from by complete evaporation off of the solvent of an aliquot quantity of the starting miscella. The yields are shown relatively in percent of comparison extract (comparison extract =100%).

TABLE 7

Lipid yields from the miscella after precipitation by increasing the water content, in percent of the comparison extract (equals 100%): values for water content in absolute percent

| Water Content | 25.0 | 35.7 | 43.75 | 50 | 55 |
|---|---|---|---|---|---|
| GE | 46.06 | 78.63 | 84.76 | 87.31 | 88.73 |
| LE | 48.28 | 74.92 | 80.68 | 84.8 | 88.32 |
| FS | 51.59 | 90.07 | 93.24 | 94.61 | 84.7 |
| 20-4 n6 | 64.56 | 100.2 | 102.9 | 103.1 | 97.58 |
| 20-5 n3 | 57.49 | 97.94 | 102.32 | 104.41 | 95.62 |

GE = total extract; LE = lipid extract; FS = fatty acids; 20-4 n6 = arachidonic acid; 20-5 n3 = eicosapentanoic acid The values in Table 7 show that increasing the water content of the miscella from 10% to 35% is already sufficient for the lipids, in which the indicative fatty acids arachidonic acid and eicosapentanoic acid are localized, to be virtually quantitatively precipitated out. The values over 100% are suspected to be the result of the fact that because of the greater purity of the lipid fractions after precipitation in comparison with the comparison extract, the fatty acids can be more completely converted into the derivatives that are determinable by gas chromatography.

The method of lipid precipitation from the miscella employed here, by increasing the water content, also has the following advantages in terms of the process:

1. As a result of the major increase in the water content of the miscella, prepurification of the extract takes place, because hydrophilic substances, which at a 10% water content of the extraction agent are already co-extracted, remain in solution and in this way need not be removed from the total lipid extract only afterward by complicated processes.

2. Alginates or carragheenins, which are extracted primarily from native algae in sometimes quite major quantities with 90% ethanol, can cause problems in solvent recovery in modern evaporator systems (such as downflow evaporators). However, if the lipid extract is obtained by adding water from the miscella, then the excess water keeps the hydrophilic hydrocolloids in solution, so that the separation of the solvent from the remaining miscella can be carried out without problems.

In order to check whether a selective precipitation of the lipids from the miscella and hence a variation in the fatty acid pattern of the lipids occurs from the water addition, the extract precipitated out with a miscella water content of 55% and the comparison extract were studied by gas chromatography as an example.

Extract 1 listed in Table 8 below was obtained from the starting miscella by increasing the water content to 55%, while the comparison extract was obtained by evaporating the solvent out of the starting miscella.

TABLE 8

Fatty acid pattern of an extract precipitated out with a 55% water proportion, compared with the total extract: figures given in weight % of the total fatty acids

| Fatty Acids | Extract 1 | Comparison Extract |
|---|---|---|
| 14-0 | 8.26 | 7.9 |
| 14-1 n5 | 0.76 | 0.69 |
| 16-0 | 19.73 | 18.9 |
| 16-1 n7 | 4.28 | 4.32 |
| 18-0 | 0.43 | 0.39 |
| 18-1 n9 | 24.56 | 22.46 |
| 18-2 n6 | 7.88 | 7.43 |
| 20-0 | 0.37 | 0.34 |
| 18-3 n3 | 6.97 | 6.77 |
| 20-1 n9 | 0.17 | 0.15 |
| 20-2 n6 | 0.27 | 0.26 |
| 20-3 n6 | 0.4 | 0.37 |
| 22-1 n9 | 0.08 | 0.07 |
| 20-4 n6 | 11.44 | 10.72 |
| 20-5 n3 | 10.56 | 10.01 |
| 22-6 n3 | 0.46 | 0.36 |

The results of the fatty acid analysis in Table 8 show that the fatty acid spectra of the two extracts are not substantially different. The proportions of the indicative fatty acids arachidonic acid and eicosapentaenoic acid, at 10 to 11 weight %, also virtually agree. This result confirms the findings already shown in Table 7, that by purposeful addition of water a quantitative precipitation of the lipids and fatty acids from the raw miscella is possible.

EXAMPLE 6

The separation of the neutral lipid extract by extraction with compressed gases is described below.

In a suitable system, the miscella obtained with organic solvents (preferably ethanol) or an extract freed completely or partially of the solvent is brought into contact in an extraction autoclave with compressed gases, preferably carbon dioxide. An entraining agent can be added in metered fashion to the compressed gas in order to purposefully adjust the extraction properties.

If the liquid solvent was removed completely from the extract and no entraining agent was admixed with the extraction gas, then the triglycerides, carotenoids, chlorophylls and phytosterols are dissolved selectively out of the extract. By a suitable selection and metered addition of the entraining agent or incomplete separation of the liquid solvent from the extract, the dissolution properties of the extraction gas can be expanded substantially.

By reducing the pressure and/or raising the temperature of the extraction gas, its solubilizing capacity is reduced in stages. In each of these stages, a certain portion of the dissolved lipids occurs as an extract fraction. In this way, fractionation of the lipids into one nonpolar and one polar fraction primarily takes place. The nonpolar lipid fraction can then, in the course of a multistage precipitation, be subjected to further fractionation.

This separation will be described in detail in terms of a $CO_2$ high-pressure countercurrent extraction of a miscella.

An aliquot of a miscella that was obtained by maceration of alginate 2 with 90% ethanol is extracted in countercurrent with compressed carbon dioxide (150 bar, 35° C.) in a stripper column. After the extraction, the compressed gas is expanded in a precipitation autoclave to 20 bar, so that the lipid dissolved in the fluid occurs in the form of extract. The fraction not soluble in the fluid collects at the bottom of the column. It comprises polar lipids and the non-lipophilic remaining extract. The fill level of the separator and of the stripper column can be monitored visually during the extraction via viewing windows. In the course of the extraction, when a certain fill level is attained, both fractions can be removed via a valve.

The maceration was carried out in this example as a one-stage batch extraction at 35° C. for 20 hours. The miscella concentration prior to high-pressure extraction was 1.37% in terms of the total extract and 1% in terms of the lipid extract. Some of the miscella obtained by the maceration was removed and used for the high-pressure extraction. After the high-pressure extraction, 41.3% of the total extract and 50.9% of the lipid extract could be found in the separator.

Gas Chromatography Investigation of the Extracts in the Separator and Prior to the High-pressure Extraction In order to be able to evaluate whether the neutral lipid extract obtained by high-pressure extraction differs in the composition of the fatty acids compared with the total extract of the fractionation, a gas chromatography analysis of the fatty acid pattern of the extract was carried out before and after the high-pressure extraction.

TABLE 9

Fatty acid pattern of a lipid extract of alginate 2, obtained by maceration, before and after high-pressure extraction (HD-E) in weight % of the total fatty acids

| Fatty Acids | Before HD-E | After HDE i.S. |
|---|---|---|
| 14-0 | 8.25 | 7.65 |
| t14-1 n5 | 0.07 | 0.00 |
| 14-1 n5 | 0.41 | 0.27 |
| 15-0 | 0.36 | 0.11 |
| 16-0 | 20.17 | 19.42 |
| t16-1 n7 | 0.27 | 0.23 |
| 16-1 n7 | 3.56 | 3.42 |
| 17-0 | 0.15 | 0.11 |
| 18-0 | 1.04 | 0.61 |
| t18-1 n9 | 0.07 | 0.02 |
| 18-1 n9 | 26.02 | 22.85 |
| 18-2 n6 | 7.10 | 6.18 |
| 19-0 | 0.00 | 0.00 |
| 18-3 n3 | 4.68 | 6.18 |
| 18-4 n3 | 9.64 | 12.47 |
| 20-0 | 0.61 | 0.39 |
| 20-1 n9 | 0.14 | 0.05 |
| 20-2 n6 | 0.49 | 0.42 |
| 20-3 n6 | 0.50 | 0.35 |
| 20-4 n6 | 7.84 | 7.60 |
| 20-3 n3 | 0.14 | 0.15 |
| 20-5 n3 | 7.68 | 10.37 |
| 22-0 | 0.05 | 0.07 |
| 22-1 n9 | 0.11 | 0.17 |
| 24-0 | 0.07 | 0.06 |
| 24-1 n9 | 0.10 | 0.28 |
| 22-06 n3 | 0.11 | 0.03 |
| Total | 100 | 100 |

HD-E = high-pressure extraction; FS = fatty acids; i.S. = in the separator

Comparison of the fatty acid spectra of the lipid extracts before and after the high-pressure extraction shows that the fatty acid pattern of the neutral lipid fraction does not differ substantially from the total extract. The proportion of the physiologically significant fatty acids arachidonic acid (20-4 n6) and eicosapentaenoic acid (20-5 n3) in the neutral lipid extract does not vary toward the negative as a result of the high-pressure extraction, but in the case of the eicosapentaenoic acid on the contrary even rises.

The results of this experiment show that the LCPs are localized in substantial proportions in the neutral lipids of the residues from alginate production.

We claim:

1. A method for obtaining lipids with a high proportion of long-chain polyunsaturated fatty acids (LCPs) having from 20 to 22 carbon atoms by extraction from a raw material of plant origin, characterized in that as the raw material residues from alginate or carrageenan production which have been subjected to drying to provide a water content of $\leq 50$ weight % and a particle size of $\leq 50$ mm are used, and that for extraction an organic solvent or a compressed gas is used.

2. The method of claim 1, characterized in that a raw material with a water content of 5 to 50 weight % and with a particle size of 0.01 to 50 mm is used.

3. The method of claim 1, characterized in that extraction is done with a solvent miscible with water in any ratio, at a temperature of 20° C. to 65° C. and that the extraction is carried out in the form of a batchwise extraction (maceration) percolation, decanter extraction or countercurrent extraction.

4. The method of claim 1, characterized in that the extraction liquid (miscella) obtained with the aid of a solvent miscible with water in any ratio at 20° C. or more is diluted with water and/or cooled down to between +20° C. and −60° C. to such an extent that the lipid extract at least partly precipitates out, and that the thus-obtained lipid extract is separated.

5. The method of claim 1, characterized in that the miscella obtained with the aid of an organic solvent, or the extract obtained from it and partially or completely freed of solvent, is extracted with a compressed gas, and the neutral lipid fractions dissolved in the compressed gas and as desired the polar lipid fraction that has not entered into solution in the compressed gas are isolated.

6. The method of claim 1, characterized in that the extraction is carried out to maintain the pressures of the compressed gases from 60 to 2000 bar and the temperature from −20° C. to +200° C.

7. The method of claim 1, characterized in that carbon dioxide is used as the compressed gas, to which an entraining agent may be added.

8. A lipid extract or lipid extract fraction of residues of alginate or carrageenan production, characterized by a content of arachidonic acid of at least 5 weight % and/or a content of docosahexanoic acid of at least 3 weight %, referred to the total weight of the fatty acids.

9. A lipid extract or lipid extract fraction, obtainable by the method of claim 1.

10. The lipid extract or lipid extract fraction of claim 9, characterized by a content of arachidonic acid of at least 5 weight % and/or a content of docosahexanoic acid of at least 3 weight %, referred to the total weight of the fatty acids.

11. A food, characterized in that it contains a lipid extract or a lipid extract fraction of claim 8.

12. An additive to the fat body of infant nutrition products, to dietetic products for arteriosclerosis prevention, to dietetic products for the prevention of autoimmune diseases (atopias) and to cosmetic products, consisting essentially of the lipid extract or lipid extract fraction of claim 8.

13. The method of claim 2, characterized in that a raw material with a water content of 5 to 15 weight % and with a particle size of 0.1 to 1.0 mm is used.

14. The method of claim 3, characterized in that the solvent miscible with water is a low alcohol and the extraction is done at a temperature of about 60° C.

15. The method of claim 4, characterized in that the solvent miscible with water is ethanol, and the extraction liquid (miscella) is diluted with water to 20 to 90 volume %.

16. The method of claim 6, characterized in that the extraction is carried out to maintain the pressures of the compressed gases from 70 to 500 bar and the temperature from +20° C. to +60° C.

17. A product produced by the method of claim 1.

* * * * *